US007249005B2

(12) United States Patent
Loberg (10) Patent No.: US 7,249,005 B2
(45) Date of Patent: Jul. 24, 2007

(54) DESIGN SOFTWARE INCORPORATING EFFICIENT 3-D RENDERING

(75) Inventor: Barrie Arnold Loberg, Calgary (CA)

(73) Assignee: Dirtt Environmental Solutions Ltd., Calgary, Alberta (CA)

( * ) Notice: Subject to any disclaimer, the term of this patent is extended or adjusted under 35 U.S.C. 154(b) by 0 days.

(21) Appl. No.: 11/204,419

(22) Filed: Aug. 16, 2005

(65) Prior Publication Data
US 2006/0055696 A1    Mar. 16, 2006

Related U.S. Application Data

(60) Provisional application No. 60/602,233, filed on Aug. 17, 2004.

(51) Int. Cl.
*G06F 17/50*    (2006.01)
(52) U.S. Cl. .......................... 703/1; 345/426; 345/581; 345/630; 345/633; 434/72; 434/75; 434/79; 434/80
(58) Field of Classification Search .................... 703/1; 345/420, 426, 593, 607, 619, 679, 681
See application file for complete search history.

(56) References Cited

U.S. PATENT DOCUMENTS 5,255,207 A * 10/1993 Cornwell ........................ 703/1
5,293,479 A * 3/1994 Quintero et al. ............. 715/841
5,977,982 A * 11/1999 Lauzon ........................ 345/582
6,014,503 A * 1/2000 Nagata et al. .................. 703/1
6,662,144 B1 * 12/2003 Normann et al. ............... 703/1
2001/0047250 A1 * 11/2001 Schuller et al. ................ 703/1
2002/0144204 A1 * 10/2002 Milner ........................ 714/746

FOREIGN PATENT DOCUMENTS

JP    EP1204046 A1    5/2002

OTHER PUBLICATIONS

Chan, et al.: "Design of a Walkthrough System for Indoor Environments from Floor Plans"; Proceedings of the 1998 IEEE Conference on Information Visualization, Jul. 29-31, 1998, pp. 50-57.

* cited by examiner

*Primary Examiner*—Paul Rodriguez
*Assistant Examiner*—Jonathan Teets
(74) *Attorney, Agent, or Firm*—Workman Nydegger (57) ABSTRACT

Design software in accordance with an implementation of the present invention is configured to provide believable three-dimensional representations of user selections in real-time. Design elements that would otherwise be difficult to efficiently render three-dimensionally in real-time are prerendered for realistic visual effects, such as realistic shading, which correspond to various positions of the elements in a design space. Blanks of the visual effects for each position are then stored in a data store for visual effects. At run time, data associated with user design choices, as well as the blanks for any corresponding design elements are fed in one implementation to peripheral processing hardware, such as a GPU, which sends the processed data to a display device. The user is therefore able to view complex visual data of certain design choices efficiently with added realism.

20 Claims, 6 Drawing Sheets

DESIGN SOFTWARE INCORPORATING EFFICIENT 3-D RENDERING

CROSS-REFERENCE TO RELATED APPLICATIONS

The present invention claims the benefit of priority to U.S. Provisional Patent Application No. 60/602,233, filed on Aug. 17, 2004, entitled "Method and Apparatus for the Selection, Organization and Configuration of Products through Object Oriented Design Intent", the entire contents of which are incorporated by reference herein.

BACKGROUND OF THE INVENTION

1. The Field of the Invention

This invention relates to systems, methods, and computer program products for modeling, such as the design of commercial and residential interiors, and related spaces.

2. Background and Relevant Art

As computerized systems have increased in popularity, so has the range of applications that incorporate computational technology. Computational technology now extends across a broad range of applications, including a wide range of productivity and entertainment software. Indeed, computational technology and related software can now be found in a wide range of generic applications that are suited for many environments, as well as fairly industry-specific software.

One such industry that has employed specific types of software and other computational technology increasingly over the past few years is that related to building and/or architectural design. In particular, architects and interior designers (or "designers") use a wide range of design software for designing the aesthetic as well as functional aspects of a given residential or commercial space. In some such cases, the designer might use some software programs that might be better suited for exterior design, and then use other software programs that might be better suited for interior design. For example, a designer might implement one software program to design an overall look of a building, and then use the software to design or position each of the functional components of the building, such as weight-bearing walls, trusses in a roof, positioning of electrical outlets, and so on. The designer might then use another software program, whether separately, or as an add-on to the first software program, to design functional walls for offices, design where to place work stations, design the position of desks, chairs, lamps, and so forth.

When designing the exterior and/or interior of a given residential or commercial space, the designer will ordinarily need to take care that each of the elements in the design are structurally sound when built. This is because typical design software allows spaces to be fairly configurable to suit the user's tastes without specific regard in many cases to whether the design will actually work. For example, one typical software design program might allow an architect to design a roof or ceiling that is ill-suited for the number or type of weight-bearing walls the architect has presently drawn. If the roof were actually constructed as designed by the architect, the roof or ceiling might collapse. In a situation such as this, however, the builder might indicate to the architect that the design is physically impossible or impractical, and ask for a redesign. This, of course, can lead to any number of inefficiencies.

Part of the problem with many design software programs that can lead to designing physically impractical structures is the notion that many such design problems require some drawing of a space in flat, two-dimensional space. For example, the outside of a building is designed in a view that emphasizes primarily only height and width, while a top ("plan") view of a building is designed in a view that emphasizes primarily only length and width. With views such as these, the designer will either need to independently visualize the three-dimensional spacing, or will need to perform a separate rendering of the design, if the software allows for it.

While three-dimensional rendering is available in some design software, three-dimensional rendering is fairly processing or resource intensive, and can take an additional amount of time. In particular, traditional rendering programs can take anywhere from several minutes to several hours to appropriately render all of the lighting and shadowing characteristics of a given space with any accuracy. Alternatively, another type of rendering program might simply generate only a very rough set of lighting and shadowing characteristics of a given space based primarily on certain assumptions about a given object's shape.

For example, a gaming engine, which is not typically used in design systems, might rely on a graphical processing unit to determine and generate certain rough visual effects in real-time. With this type of system, however, both the determination and rendering are done as the user is making selections in real-time, and, as such, is quite limited in its ability to provide believable, realistic visual effects that would be useful in a design environment. Thus, conventional software is either too processing intensive, or insufficiently processing intensive to efficiently render expected, believable visual effects of design choices in a given space.

In addition, neither the three-dimensional rendering nor the two-dimensional drawing views are designed to accommodate necessary modifications to the objects or walls, based on real-world materials, or other important constraints. For example, a designer might place several L-shaped desks in a work space that are to be arranged back to back against a cubicle wall. In an ordinary environment, positioning the L-shaped desks together might involve a next step of removing a leg where one leg might be shared, or removing a bracket from one of the L-shaped desks for similar reasons. Accordingly, both the two-dimensional views and three-dimensional renderings of conventional design software tends to capture only what is written, and requires the designer to add or remove parts in a specific drawing to reflect real-world usage. This farther encumbers the processing, or potential processing, of realistic visual effects for display, particularly in real-time.

Accordingly, an advantage in the art can be realized with systems, methods, and computer program products that provide a user with the ability to efficiently view and navigate realistic-appearing designs n a highly configurable, and yet user-friendly manner. In particular, an advantage can be realized with expert systems that are configured to specifically capture possible or practical configurations of a designer's intent.

BRIEF SUMMARY OF THE INVENTION

The present invention solves one or more of the foregoing problems in the prior art with systems, methods, and computer program products configured to efficiently render the visual effects for a user's design choice in a two or three-dimensional view in real-time. In particular, implementations of the present invention relate in part to prerendering lighting, shading, shadowing, or other such visual effects through a conventional central processing unit, and then later processing these effects, along with any other relevant information about the user's design choice, at a graphical processing unit during run-time.

For example, a method in accordance with an implementation of the present invention of accurately and efficiently rendering three-dimensional views of a user's design choices involves receiving user input regarding the positioning of a design element in a design space. Generally, the user input includes one or more attributes associated with the design element. For example, the user input can relate to where a desk goes in relation to a wall, as well as preferences for coloring or material, and the like.

The method also involves retrieving a blank for the design element from a data store. The blank will generally be a template of a visual effect for the design element, such as for shading, shadowing, or other visual effects that might be expected for a given position of a design element. This method further involves a step for providing an accurate three-dimensional view of the user input at a display device through communication with a graphical processing unit. This step generally involves the graphical processing unit providing a display device with the appropriate information so that the display device can display accurate visual effect data for the design element.

Another method in accordance with an implementation of the present invention involves prerendering one or more design elements in part by identifying one or more positions of a design element to be placed in a design space. For example, a user or software engineer determines one or more possible positions of a table or chair, and also determines expected visual effects, such as shadowing, for the table or chair in one or more positions. The method also involves rendering a visual effect for each of the one or more positions, and creating one or more blanks corresponding to each of the one or more positions. Generally, the one or more blanks contain data about a corresponding visual effect for the design element, where the visual effect data is separated from other data such as the size, color, or material used for the design element. In addition, the method involves passing the created one or more blanks to a data store. As such, the one or more blanks can later be accessed by a graphical processing unit, in response to user input for the design element.

Accordingly, implementations of the present invention include front-end and run-time (or both) perspectives that ultimately provide a user of design software with a believable, realistic depiction of design choices in real-time, or as the user is designing a design space. This accurate and real-time creation of the user's design choices can ensure elements are placed in physically appropriate locations, and can also ensure that elements are positioned with functional and ergonomic considerations in mind.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods, and computer program products configured to efficiently render the visual effects for a user's design choice in a two or three-dimensional view in real-time. In particular, implementations of the present invention relate in part to prerendering lighting, shading, shadowing, or other such visual effects through a conventional central processing unit, and then later processing these effects, along with any other relevant information about the user's design choice, at a graphical processing unit during run-time.

For example, as will be understood in greater detail in the following description and claims, at least one aspect of the invention relates to front-loading the processing of much of the rendering (i.e., "prerendering") of certain visual effects, which, in some cases can be fairly time-intensive. In particular, rendering of certain types of visual effects can be done by a central processing unit ("CPU") at a computer, where the prerendering can result in one or more templates, or "blanks", which can be later accessed by a graphical processing engine and graphical processing unit. These templates can be stored with the design software, and then retrieved as needed during run-time.

As such, another aspect of the invention relates to passing previously prepared templates, or blanks, to the graphical processing unit ("GPU") of a computerized system, along with any other relevant information about a user's design choices. In general, GPU and related hardware is often more able to handle the demands that may be needed for some cases of accurate graphical rendering. These and other aspects of the invention are described with greater detail in the following text.

Figure 1:
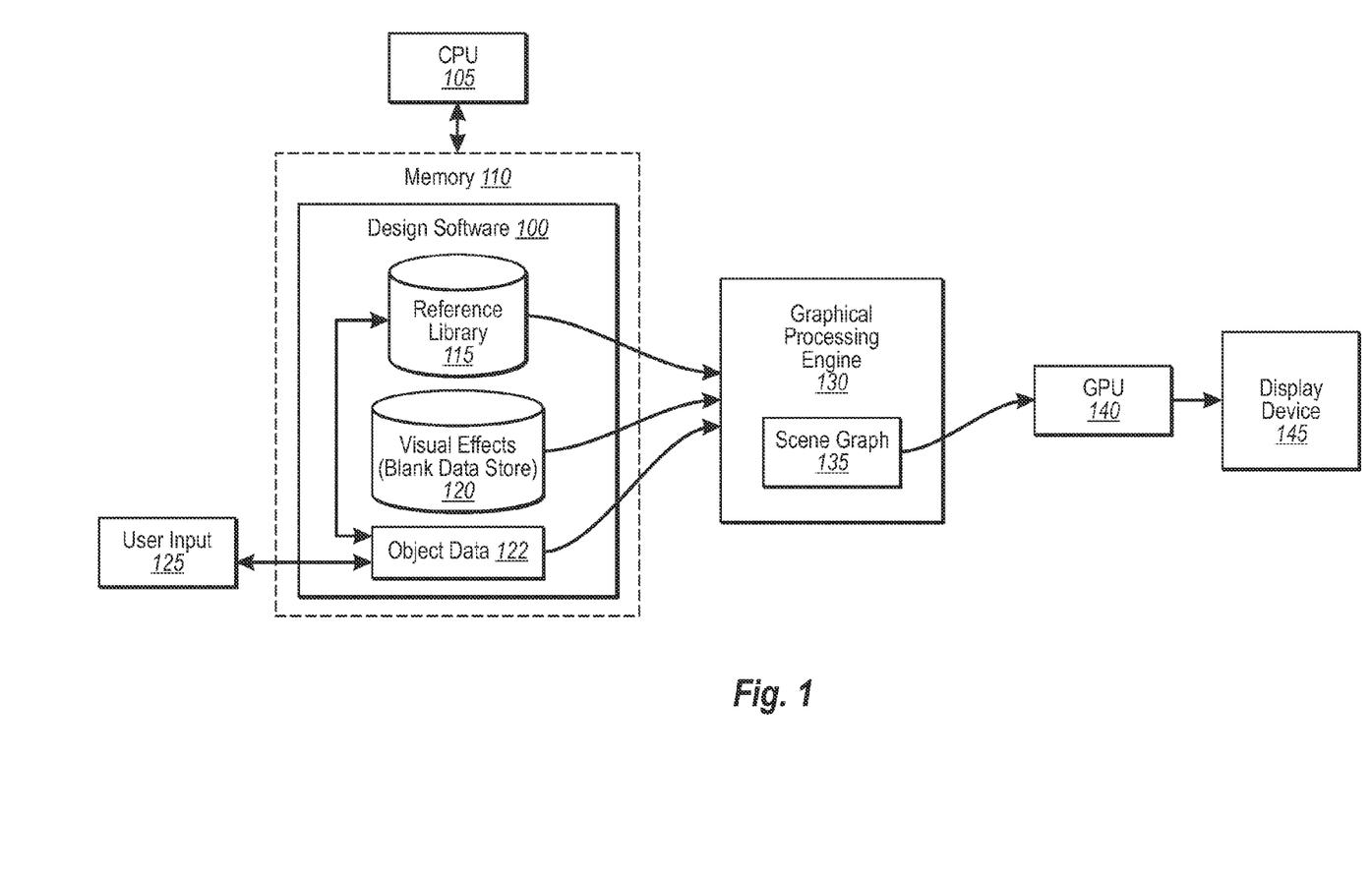
FIG. 1 illustrates a schematic diagram in accordance with an implementation of the present invention in which visual effects are passed from a database to a graphical processing unit before being displayed.

For example, FIG. 1 illustrates an overall schematic diagram of a system in which user design choices are rendered in real-time for a display device. As shown, design software 100 is loaded in memory 110 of a computerized system. The design software 100 includes a reference library 115 component and a visual effects component 120 (or "Blank Data Store").

Generally, the reference library 115 includes all of the physical factors of a given element (such as a design element in an architectural application, or an element of an apparatus). The physical factors stored in the reference library are ultimately correlated with attributes of user input, such as the position, or types of materials that can be used with one type of table or chair versus another, as well as the types of materials that are shared between tables or chairs when put in position. The reference library 115 also includes information regarding possible positioning of elements in a space, such that the design software can prohibit certain sizes of a table, or prohibit a table from being placed on top of a wall, or the like. Information from the reference library 115 component is also combined with user input in the object data 122 component. The object data 122 component includes program objects and related data that are created in conjunction with reference library 115 information based on a sequence of one or more user design choices, and one or more attributes associated with those design choices.

Additional and detailed descriptions of using data objects to capture a user's design intent, as well as more detail of the relationship between user input and attributes, are found in commonly-assigned U.S. patent application Ser. No. 11/204,421, filed on Aug. 16, 2005, entitled "Capturing a User's Intent in Design Software"; and in U.S. patent application Ser. No. 11/204,420, also filed on Aug. 16, 2005, entitled "Capturing a User's Design Intent With Resolvable Objects". The entire content of each of the aforementioned patent applications is incorporated by reference herein.

In general, the visual effects data store 120 includes information regarding—as the name implies—possible visual effects for any position of a design element relative to another element such as a floor, table, wall, etc. These visual effects can include shading, shadowing, or other general lighting characteristics for a chosen position of the element. For example, the visual effects data store 120 includes lighting templates for an L-shaped table when put against a wall, as well as a separate visual effects template for the table when free standing in the middle of a room, near a window, or the like. The visual effects data store 120 can also include information regarding orientations of the design element, such as when the table is facing downward, upward, leftward, or rightward, and so forth. FIG. 1 shows that this information, as well as information from the reference library 115 and data objects 120 component are processed by the CPU 105.

This processing, however, contrasts with processing that occurs with respect to real-time rendering of visual effects to a display device for the user's view. For example, FIG. 1 also shows that the design software 100 passes data from the reference library 115, the visual effects data store 120, and any other related object data 122 to graphical processing engine 130, which may or may not be loaded into the main memory 110. That is, the graphical processing engine 130 may be installed in other implementations on, for example, the graphics hardware on which the GPU 140 is found. Thus, FIG. 1 illustrates an example where the design software 100 and peripheral input device (not shown) processing is handled by central processing unit 105, while processing for visual effect data is handled by graphical processing unit ("GPU") 140.

In particular, FIG. 1 shows that the design software 100 passes data from the reference library 115, data store 120, and the object data 122 to graphical processing engine 130, in response to user input 125 for a specific view. For example, the user might have positioned a certain chair and/or table in a two-dimensional design space (e.g., FIG. 3), and sends an input 125, with one or more corresponding attributes (e.g., position, size, color, material, etc.) to the design software 100 signaling a desire to see the elements in a three-dimensional view. Based on the type of elements (e.g., chair and table) selected, and based on the position of the elements in the design space, the design software 100 determines that the three-dimensional view will include certain visual effects for added realism. Each individual visual effect, in turn, is found in the data store 120.

The design software also identifies, for example, that the user has selected a blue table top (not shown), and so pulls from the reference library 115 the available color and material that either match, or closely match, the user's design choices. The design software further identifies other variables associated with the user's design choice, such as the size (e.g., stretching) or X/Y positioning of the given design element in the design space. The design software 100 then pulls this data from an object data module 120, and then passes the data of the reference library 115, the data store 120, and any relevant object data 122 to the graphical processing engine 130.

In general, the graphical processing engine 130 comprises one or more sets of computer-executable code that are configured to prepare data for processing at the GPU 140, such that the GPU processes (i.e., generates) corresponding pixel information to be sent to display 145. In one implementation, the graphical processing engine 130 is similar in some respects to a game engine, which takes data from one program component and passes the data to another program component, as necessary, to identify appropriate pixel information. As shown in FIG. 1, for example, the graphical processing engine 130 receives data from the design software 100, and holds the data passed from the design software in a "scene graph" 135. A scene graph is effectively a data store that coordinates location and other relevant information for each element of data to be rendered.

The graphical processing engine 130 then prepares a combined data stream, and passes along the stream to the GPU 140. GPU 140 then processes the combined data stream separately from other processing components in the computer system, and sends the processed data (e.g., pixel information) to a display device 145. Since much of the detailed rendering of the visual effects has been done previously and turned into a template (or "blank"), the GPU 140 can produce a fairly accurate data stream from the template without requiring a significant amount of additional processing resources and processing time.

At least one result of this process is that the user can view a detailed and realistic-appearing view of the current design choices in the design space almost instantly after requesting it from the design software 100. Furthermore, the user can navigate different visual effects of different angles for the design elements throughout the three-dimensional view without needing to wait for additional processing. Thus, the design software 100 can provide a much richer viewing experience to the user regarding how various design choices will look in a real-world environment, in much quicker time.

Figure 2:
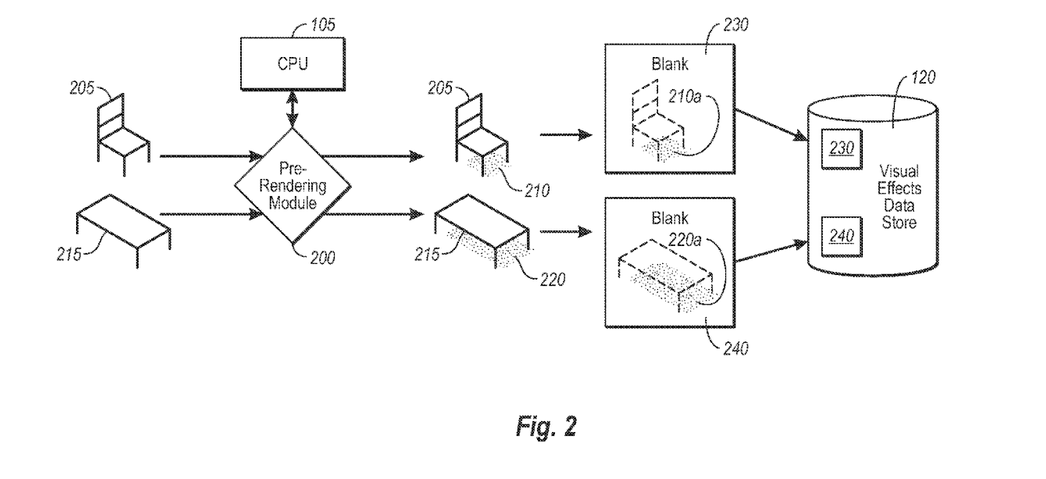
FIG. 2 illustrates a schematic diagram in accordance with an implementation of the present invention in which a chair and a table are prerendered into blanks that passed to a data store.

FIG. 2 illustrates a conceptual diagram of an exemplary prerendering phase in accordance with one or more implementations of the present invention. In particular, FIG. 2 shows where a chair 205 and a table 215 are prerendered into one or more visual effects that are stored for subsequent processing in data store 120. As shown, one position of a chair 205 and one position of a table 215 are passed to prerendering module 200. These specific positions of the chair 205, table 215, or other elements such as a wall (not shown), lamp (not shown), or other such design element will typically be determined in advance by an engineer for the design software 100. (There may, however, be other instances where the user may want to decide additional visual effects to include with the design software 100.) For example, the user or engineer might decide that when the chair 205 is placed against a wall (not shown) on one side, the chair will need to have one type of shadow, while the chair will have another shadow when placed against the wall on the opposing side, perhaps since there is an additive or cancelled effect of chair and wall shadows.

The user or engineer might also determine that the chair or table will have still another shadow or visual effect when placed by itself in the middle of a design area. In other cases, the user or engineer simply assumes a consistent, multi-directional light source that causes a consistent shadow for the design element in virtually any position. One will appreciate, therefore, that the possibilities for rendering of various types of visual effects, and for creating corresponding blanks, are essentially endless.

The user or engineer then passes the relevant element positions into a prerendering module 200. The prerendering module 200 then creates a separate visual effect for each orientation of each element. In particular, different shading or lighting effects for chair 205 in 5 different positions will mean that the prerendering module may render at least 5 separate visual effects that can be translated into separate corresponding blanks (e.g., 230). In other cases, the prerendering module 200 can generate more or fewer blanks (i.e., reusable for different positions), as needed. The prerendering module 200 in turn uses the CPU 105 for this processing, which can take anywhere from about a few minutes to a few hours for each visual effect.

As shown in FIG. 2, for example, the prerendering module 200 has created (i.e., "rendered") one or more visual effects (e.g. one or more shadows 210) for chair 205 and one or more visual effects (e.g., one or more shadows 220) for table 215, each shadow being rendered for corresponding orientations or positions of the chair or table. In particular, each shadow 210 or 220 can be a single shadow, or a composite of one or more shadows created from different light sources. In other implementations, the user or design may have also independently rendered multiple positions of separate components of the chair or table for added accuracy. For example, the user or engineer might have independently rendered each chair leg and chair back independently from the stool portion of the chair. Thus, it will be appreciated that the illustrated example shows only a basic shadow visual effect for purposes of convenience.

After rendering the visual effect, the prerendering module 200 creates a "blank" 230 for the chair and a "blank" 240 for the table for the given orientation. In general, a "blank" is an accessible data file that includes a template for the given visual effect. That is, the blank represents a dissociation of the image of the element (e.g., the image of chair 205) from the rendered visual effect (e.g., the image of shadow 210). For example, FIG. 2 shows that blank 230 includes one orientation of a shadow 210a, and blank 240 includes one orientation of a shadow 220a. The prerendering module 200 then passes the created blanks 230 and 240 into the visual effects data store 120, where they can be accessed as needed.

Figure 3:
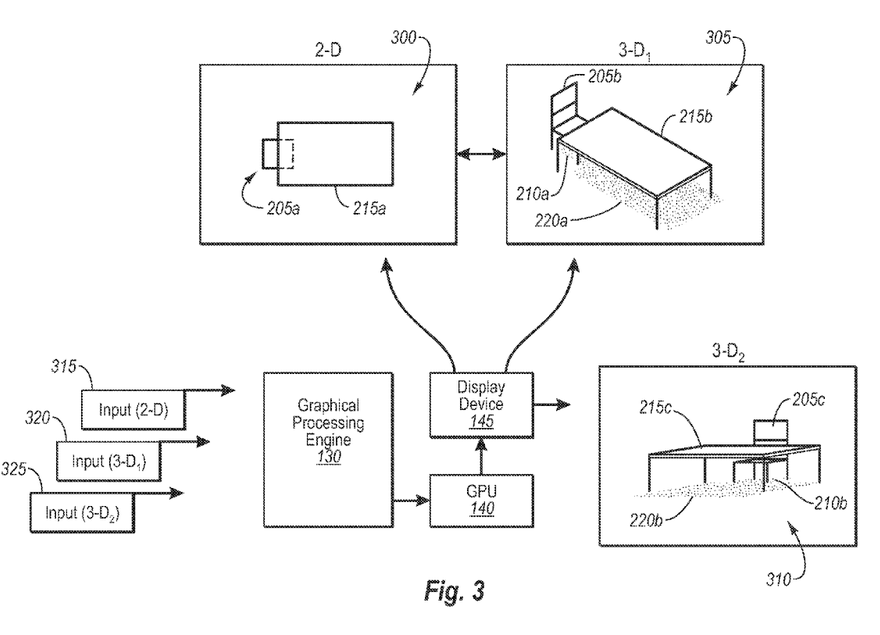
FIG. 3 illustrates a schematic diagram in accordance with an implementation of the present invention in which multiple user inputs are rendered in real-time for two or three-dimensional views.

For example, FIG. 3 shows that a first user input 315 includes positioning table 215a and chair 205a in a particular position of a two-dimensional view 300. To implement this view, the graphical processing engine 130 combines the user input as received from the design software, in addition to any other elements that might be important for the two-dimensional view, as described earlier. The graphical processing engine 130 then passes the relevant data to GPU 140 for processing, and the GPU 140 passes a processed data stream to the display device 145. Thus, input 315 results in "2-D" view 300.

The user can then view the table 215a and chair 205a and move, reposition, or change the design elements however the user sees fit. For example, the user can even change the chair 205a to another element, such as another table, or can make a selection for another color or material used by the chair or table. Each user change such as this can involve the design software 100 extracting additional information from the object data 122 (or reference library 115, when appropriate) and passing this information to the graphical processing engine 130.

When the user selects a three-dimensional view, such as with input 320, the design software 100 passes any corresponding blanks (e.g., 230 and 240) to the graphical processing engine 130, as appropriate. (In other cases, the blanks 230 and 240 were already passed to the graphical processing engine 130, and the design software 100 simply tells the graphical processing engine 130 to use what it already has been given.) The graphical processing engine 130 then passes the relevant data to the GPU 140, and the GPU 140 processes the corresponding data stream to the display device 145. As shown, input 320 therefore results in "3-D1" view 305, which is a three-dimensional view of the chair (i.e., 205b), and the table (i.e., 215b) that includes visual effects.

FIG. 3 also shows that the user can navigate through other perspectives of the three-dimensional views, such as view "3-D$_2$" 310. That is, the GPU 140, in conjunction with the graphical processing engine 130, allows the user to navigate under tables, around corners, through ceilings, etc., while still effectively providing the expected visual effects. For example, the user provides additional input 325, which changes X/Y/Z viewing information for the design space. This input 325 can cause the graphical processing engine 130 to provide additional data to the GPU 140 for processing, or can simply tell the GPU 140 to pull other previously-processed data from cache. This additional user input can further cause the graphical processing engine 130 to receive still other blanks from the blank data store 120. These blanks (not shown) are then processed at GPU 140, in conjunction with the new user input 325, as well as previously processed data (e.g., table color or material, etc.).

As with the two-dimensional view 300, the user can also change the material, color, or other information of the table and chair (or the like) while peering through a specific 3-D view (e.g., 305, or 310). In such a case, the graphical processing engine is not likely to need additional blanks for the change in material, but may pull additional information related to material shape or color from the object data 120 and/or reference library 115. Thus, little additional data needs to be processed, resulting in a substantially immediate representation of the new input through the corresponding interface.

Accordingly, the schema shown and described in FIGS. 1-3 illustrate a number of program components, modules, and/or corresponding functions for representing user design choices in a believable, realistic view in an efficient manner.

Figure 4:
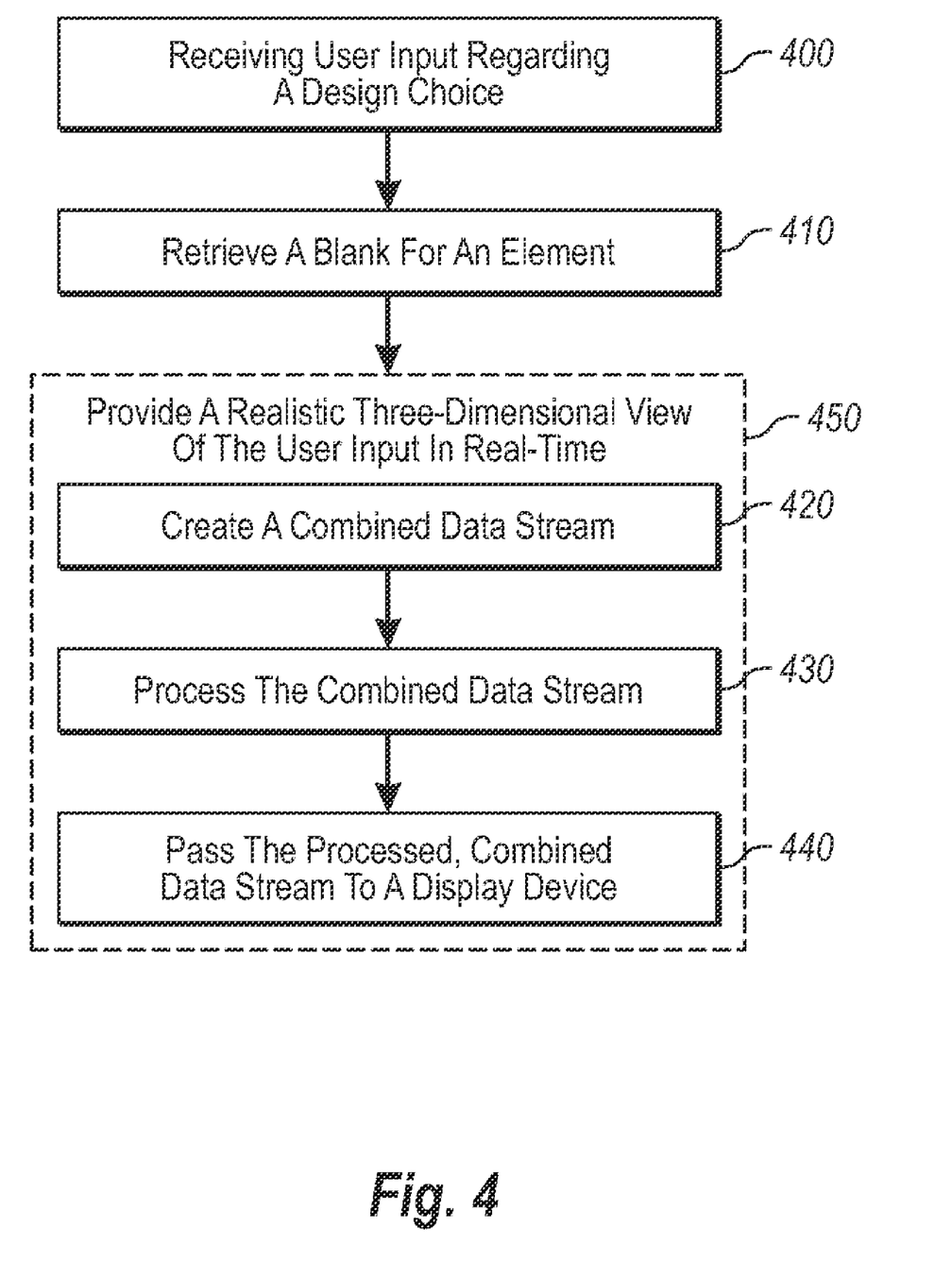
FIG. 4 illustrates a flow chart of one or more acts of and steps for accomplishing a method of accurately and efficiently rendering three-dimensional views of a user's design choices during run-time.
Figure 5:
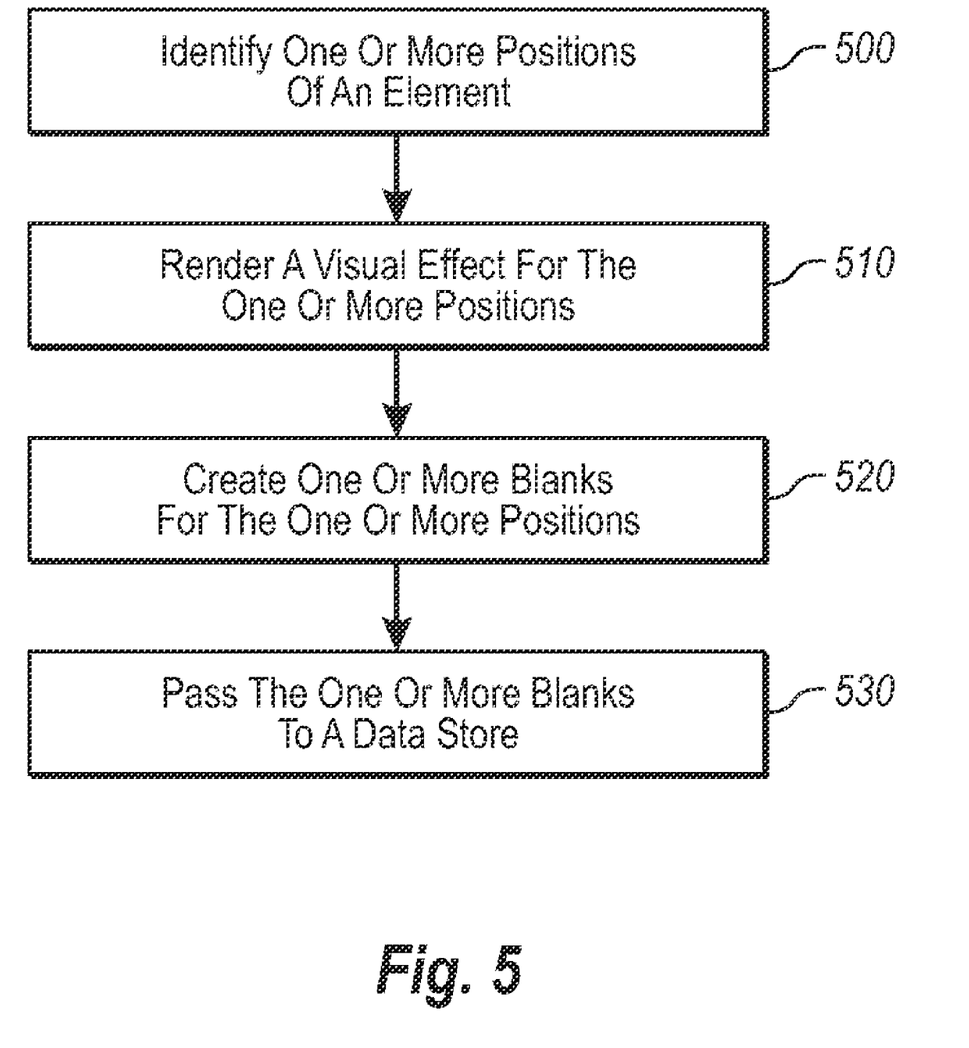
FIG. 5 illustrates a flow chart of a sequence of acts of a method of prerendering one or more visual effects for one or more selectable elements.

FIGS. 4 through 5 illustrates non-functional acts and/or functional steps that include non-functional acts for accomplishing one or more methods in accordance with the present invention. In particular, FIG. 4 illustrates a flow chart of one or more acts of and steps for accurately and efficiently rendering three-dimensional views of a user's design choices during run-time. By contrast, FIG. 5 illustrates a flow chart of one or more acts of a method for prerendering one or more visual effects for one or more selectable elements, such that the user's design choices can be rendered in real-time for a realistic display. The methods illustrated in FIGS. 4 and 5 are described below with reference to the preceding FIGS. 1-3.

For example, FIG. 4 shows that a method of efficiently rendering believable three-dimensional views comprises an act 400 of receiving user input regarding a design choice. Act 400 includes receiving user input regarding the positioning of a design element in a design space, the user input including one or more attributes associated with the design element. For example, a user uses an input device to provide input 125 to design software 100, where the user input relates to the selection and placement of a chair 205a and a table 215a in a two-dimensional design space 300.

In addition, the method of FIG. 4 comprises an act 410 of retrieving a blank for a design element. Act 410 includes retrieving a blank for the design element from a database. For example, upon receipt of a user input 320 for viewing a three-dimensional view 305 of a design space, the design software 100 and graphical processing engine 130 communicate to exchange one or more blanks (e.g., 230 and 240), if they have not already been communicated. The one or more blanks are then processed with any other relevant information for the design element for a selected three-dimensional view.

The method illustrated in FIG. 4 also comprises a step for providing a realistic three-dimensional view of the user input in real-time. Step 450 includes providing a realistic three-dimensional view of the user input at a display device through communication with a graphical processing unit, such that the graphical processing unit processes and provides to the display device accurate visual effect data for the design element. For example, when a user selects a three-dimensional view, the user is presented with a seemingly instantly-rendered three-dimensional view of a given design space that has believable-looking visual effects. The user can then navigate throughout various corners and angles of the design space in real-time, without necessarily requiring significant waiting periods for additional processing.

Although step 450 can be accomplished by any number or order of corresponding non-functional acts, FIG. 4 shows that step 450 comprises at least an act 420 of creating a combined data stream. Act 420 includes creating a combined data stream that includes one or more of the blank for the design element and any of the one or more attributes. For example, as shown in FIG. 1, graphical processing engine 130 receives data from the design software 100 relating to object data 122, any other information from a reference library 115, as well as any visual effects information from a blank data store 120. In addition, step 450 comprises an act 430 of processing the combined data stream. Act 430 includes processing the combined data stream at the graphical processing unit. For example, the graphical processing engine 130 passes the combined data stream to GPU 140, where the data is processed separately from the hardware that is processing the design software 100 in the computer system.

Furthermore, FIG. 4 shows that step 450 comprises an act 440 of passing the processed combined data stream to a display device. Act 440 includes passing the processed combined data stream to the display device upon selection of a three-dimensional view. For example, as shown in FIG. 3, after receiving input 320, the GPU 140 processes and passes generated pixel information to the display device 145, such that the display device 145 can show three-dimensional view 305. Accordingly, the method of FIG. 4 provides a user with the ability to design an interior or exterior space and also efficiently view that space in any of two or three dimensional views in an accurate manner without undue delay.

FIG. 5 illustrates another method in accordance with an implementation of the present invention, albeit from the perspective of prerendering design elements before they are processed by the GPU 140. In particular, FIG. 5 shows that a method of prerendering one or more visual effects for one or more selectable design elements, such that the user's design choices can be accurately rendered in real-time comprises an act 500 of identifying one or more positions of a design element. Act 500 includes identifying one or more positions of a design element to be placed in a design space. For example, as shown in FIG. 2, a user or software engineer will identify one or more positions, angles, or the like for a design element (e.g., chair 205, table, 215) as it is placed in a design space, such as how it is positioned next to a wall, door, or on an assumed floor, and determine a corresponding visual effect. The user or engineer might determine that a realistic shadow will face in one direction and in a certain shape when the design element is placed beside a wall on one side, and will face in another direction and in another shape when the design element is placed on the other side of the wall.

The method of FIG. 5 also comprises an act 510 of rendering a visual effect for the one or more positions. Act 510 includes rendering a visual effect for each of the one or more positions. For example, the user or engineer passes the information about desired lighting or other visual effects for each design element (e.g., chair 205, table 215) into a prerendering module 200. Typically, a CPU 105 spends as much as a few minutes to one or more hours rendering each selected visual effect for each of the one or more positions of the selected design elements.

In addition, the method of FIG. 5 comprises an act 520 of creating one or more blanks for the one or more positions. Act 520 includes creating one or more blanks corresponding to each of the one or more positions, the one or more blanks containing data about a corresponding visual effect for the design element. For example, the prerendering module 200 creates a visual effect of a shadow 210 for one position of chair 205 and a shadow 220 for one position of table 215. The prerendering module then prepares corresponding one or more blanks (e.g., 230) for the chair shadow 210a and one or more blanks (e.g., 240) for the table shadow 220a. The one or more blanks (e.g., 230, 240) essentially separate the image of the design element (e.g., chair 205 or table 215) from the visual effect, such that the file is primarily of an orientation of the visual effect by itself.

The method of FIG. 5 also comprises an act 530 of passing the one or more blanks to a data store. Act 530 includes passing the created one or more blanks to a data store, such that the one or more blanks can later be accessed by a graphical processing unit, in response to user input for the design element. For example, the prerendering module 200 passes blanks 230, 240 to data store 120. Thus, at a later point, and if the graphical processing unit 130 has not already received the corresponding blanks, the graphical processing unit 130 accesses the blanks 230, 240 via the design software 100, or directly from the data store 120 in response to user input 320 for a three-dimensional view. Thus, most, if not all, of the processing-intensive visual effects for the design elements accessed during run-time are prerendered, and made accessible through a data store. Accordingly, the method of FIG. 5 illustrates at least one way in which data that would otherwise be difficult or impossible to process in real-time can be made available, and thereby provide the user of design software with essentially instantaneous, realistic-looking views of design choices.

The foregoing schema and methods, therefore, provide designers and users with a wide variety of options for designing and viewing interior spaces. In particular, implementations of the present invention allow design spaces to be prepared and viewed quickly in a believable way, so that the designer can efficiently view how design choices will look in an actual setting. Furthermore, the provisions for essentially instant rendering of certain design effects allow the user to make better informed decisions about what design elements should go in certain places and/or in certain orientations in real-time.

As previously described, this real-time aspect can be accomplished by separately rendering complex visual effects at a CPU, and then later rendering these effects with other information at run-time in a GPU. It will be appreciated, however, that, although much of the foregoing discussion has focused on separate processing by different hardware components (e.g., CPU and GPU), separate rendering is not necessarily required. In particular, a computer system could be configured with sufficient processing power to prepare detailed, accurate visual effects, and combine those visual effects with user input pursuant to sending the data to output. For example, the design software 100 can process the intended visual effect in the CPU 105, hand off the processed visual effect to a GPU 140, and then pass the requested output in what would appear to the user as a relatively instantaneous amount of time. Thus, separate processing is only one way, albeit one convenient way, of accomplishing one or more ends of the invention.

In addition, although the discussion herein has related primarily to architectural-related design choices, implementations of the present invention are not necessarily limited thereby. In particular, the design software of the present invention can readily be configured for a wide variety of uses, such as for designing tools, machines, or other types of systems where visual effect information could be useful for positioning certain elements relative to other elements in a given space or inside an apparatus. Accordingly, it will be appreciated that the general principles articulated herein of rendering and prerendering in various stages for creating believable visual effects in real-time can have potentially wide application.

Figure 6:
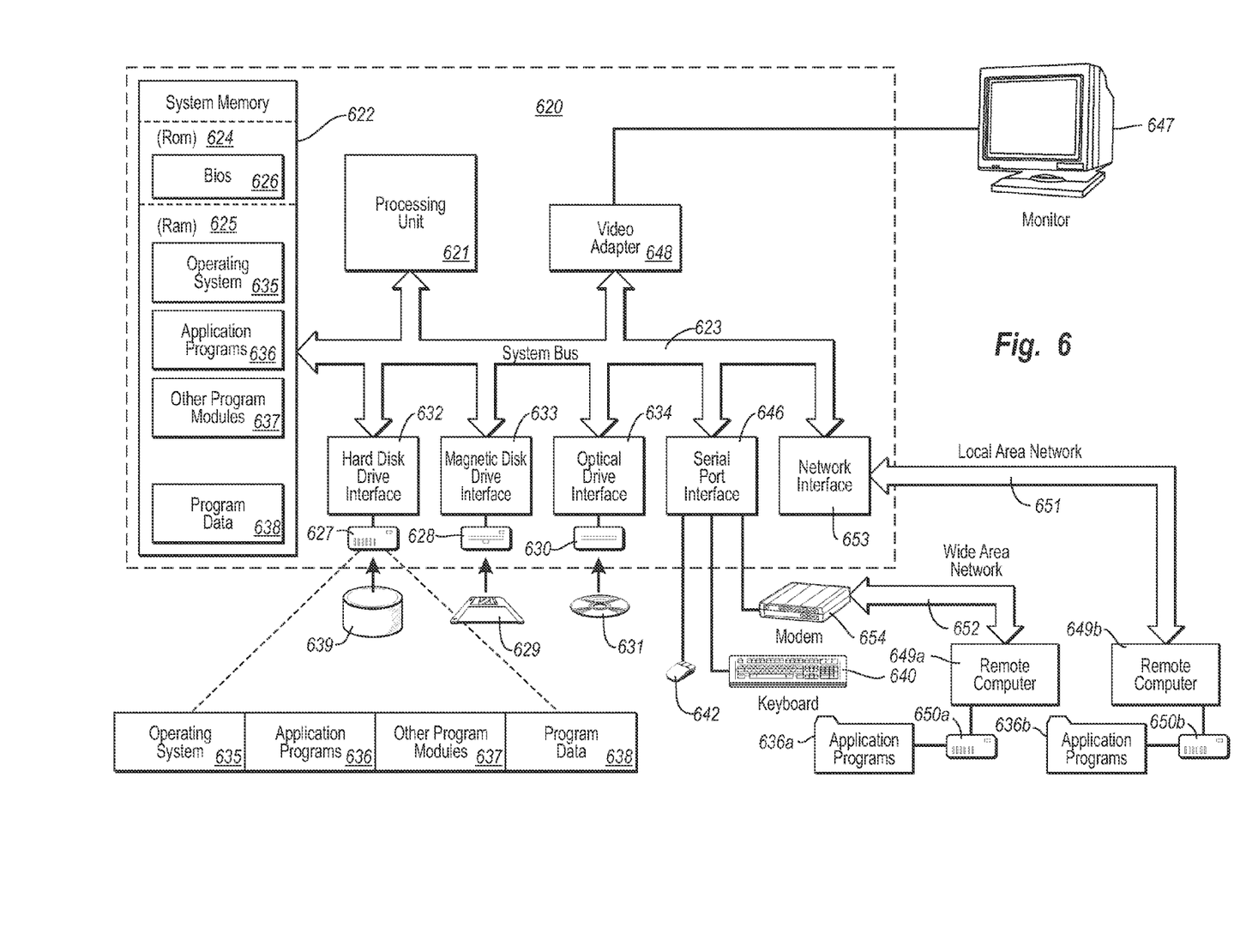
FIG. 6 illustrates a schematic diagram of a suitable computing environment for practicing one or more implementations of the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 6, an exemplary system for implementing the invention includes a general-purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures. The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disc drive 628 for reading from or writing to a removable magnetic disk 629, and an optical disc drive 630 for reading from or writing to removable optical disc 631 such as a CD ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. In a computerized architectural design environment in which a design program is loaded in memory and processed at a central processing unit, a computer-implemented method of efficiently rendering realistic three-dimensional views of a user's design choices during run-time at least in part using previously-rendered blanks for one or more of the user's design inputs, wherein the rendering allows a user to navigate a real-world depiction of the design in a three-dimensional space, the method comprising:

an act of creating a plurality of visual effect blanks for a design element in advance of any user design input, the plurality of visual effect blanks representing a visual effect for the design element at a corresponding plurality of different positions;

an act of, after creating the plurality of visual effect blanks, receiving user design input regarding the positioning of a design element in a design space, the user input including one or more attributes associated with the design element;

an act of determining which one or more of the plurality of visual effect blanks to apply to the design element based on the received positioning information;

an act of retrieving the determined one of the plurality of visual effect blanks for the design element from a data store; and a step for providing an three-dimensional view of the user input at a display device through communication with a graphical processing unit, such that the graphical processing unit processes and provides to the display device visual effect data for the design element based on the received positioning information.

2. The method as recited in claim 1, wherein the step for providing an accurate three-dimensional view of the user input comprises the acts of:

creating a combined data stream that includes the determined one or more visual effect blanks for the design element and any of the one or more attributes;

processing the combined data stream at the graphical processing unit; and passing the processed combined data stream to the display device upon selection of a three-dimensional view.

3. The method as recited in claim 2, wherein a graphical processing engine creates the combined data stream and passes the combined data stream to the graphical processing unit.

4. The method as recited in claim 2, wherein the user input is received initially via a central processing unit that is processing instructions associated with the design software and one or more peripheral devices for receiving the user input.

5. The method as recited in claim 4, wherein the act of receiving user input comprises an act of receiving data associated with the user input at the graphical processing engine after the user input has been received initially via a central processing unit.

6. The method as recited in claim 2, wherein the combined data stream further comprises object data, the object data being based at least in part on the one or more attributes.

7. The method as recited in claim 2, further comprising an act of receiving user input at a graphical processing engine via the design software, the user input indicating a preference for a three-dimensional view.

8. The method as recited in claim 7, wherein the visual effect blank comprises:

data about a corresponding visual effect that has been separated from any of size, material, or color data for the design element;

wherein the data are correlated with one or more physical factors for the design element, the one or more physical factors being defined in a reference library.

9. The method as recited in claim 8, farther comprising:

receiving additional user input regarding the position of the design element in a three-dimensional view; and retrieving from the data store a different visual effect blank that correlates with the change in position of the design element, wherein the different visual effect blank was created prior to receiving the received additional user input.

10. In a computerized architectural design environment in which a computer system receives input from a user regarding design choices for an interior or exterior design space, a computer-implemented method of prerendering one or more visual effects for one or more selectable design elements, such that the user's selections for the given design elements can be rendered with the one or more visual effects in a representation for display in real-time, comprising the acts of:
- identifying a plurality of different possible positions of the design element in an interior or exterior design space;
- rendering a visual effect for each of the plurality of positions of the design element, wherein a plurality of visual effect blanks corresponding to each of the plurality of visual effects are created for the design element in each of the plurality of different possible positions;
- passing the created one or more visual effect blanks to a data store, such that the plurality of visual effect blanks are accessible to a graphical processing unit prior to receiving a first user design input for the design element;
- receiving a first user design input indicating a preference for a first three-dimensional view of the element; and
- passing a first of the plurality of visual effect blanks to a graphical processing engine, the first of the plurality of visual effect blanks corresponding to at least one position for the design element in the interior or exterior space.

11. The method as recited in claim 10, wherein the plurality of created visual effect blanks comprise data about a corresponding visual effect that has been separated from any of position, size, material, or color data for the element.

12. The method as recited in claim 10, wherein a central processing unit processes instructions associated with rendering the visual effect and with creating the plurality of visual effect blanks.

13. The method as recited in claim 10, further comprising passing to a graphical processing engine the design element, one or more positions of the design element in the space, and corresponding plurality of visual effect blanks associated with the element.

14. The method as recited in claim 10, further comprising:
- receiving a second user design input indicating a preference for a second three-dimensional view of the design element that shows the design element from a different position compared to the first three-dimensional view; and
- passing a second of the plurality of visual effect blanks to the graphical processing engine.

15. The method as recited in claim 10, wherein the design element is a desk, table, or lamp.

16. In a computerized architectural design environment in which a computer system receives input from a user regarding design choices related to positioning design elements in an interior or exterior space, a computerized design system configured to render design elements in a design space in a believable and efficient manner so that an end-user using the computer system can navigate through a three-dimensional view of the interior or exterior design space in real-time, comprising:
- a first processor configured to create all physically possible visual effect blanks corresponding to a visual effect for all physically possible positions of a design element, wherein the total number of physically possible positions are determined via correlation with a reference library;
- wherein the first processor is further configured to pass the visual effect blanks for all physically possible positions of the design element into a visual effect data store prior to receiving any user design input into the interior or exterior design space; and
- a second processor configured to, in response to a user's positioning of a design element in a design space, receive the visual effect blanks corresponding to the design element positions selected by the user, the second processor further being configured to generate pixel information for each received visual effect blank, and for any of color, size, or material information for the design element in the interior or exterior design space.

17. The computerized design system as recited in claim 16, further comprising:
- one or more input devices; and
- a display device communicatively coupled to graphical hardware on which the second processor is mounted.

18. The computerized design system as recited in claim 16, wherein the first processor is a central processing unit and the second processor is a graphical processing unit.

19. The computerized design system as recited in claim 16, wherein the first processor receives instructions directly from the design software loaded into main memory, and wherein the second processor receives instructions indirectly from the design software via a graphical processing engine.

20. At a computerized system in a computerized architectural design environment in which a design program is loaded in memory and processed at a central processing unit, a computer program storage product having computer-executable instructions stored thereon that, when executed, cause one or more processors of the computerized system to perform a computer-implemented method of rendering three-dimensional views of a user's design choices during run-time at least in part using previously-rendered blanks for one or more of the user's design inputs, wherein the rendering allows a user to navigate a real-world depiction of the user's design inputs in a three-dimensional space, the method comprising:
- an act of creating a plurality of visual effect blanks for a design element in advance of any user design input, the plurality of visual effect blanks representing a visual effect for the design element at a corresponding plurality of different positions;
- an act of, after creating the plurality of visual effect blanks, receiving user design input regarding the positioning of a design element in a design space, the user input including one or more attributes associated with the design element;
- an act of retrieving the determined one of the plurality of visual effect blanks for the design element from a data store; and
- a step for providing an three-dimensional view of the user input at a display device through communication with a graphical processing unit, such that the graphical processing unit processes and provides to the display device visual effect data for the design element based on the received positioning information.

* * * * *

UNITED STATES PATENT AND TRADEMARK OFFICE
CERTIFICATE OF CORRECTION

PATENT NO. : 7,249,005 B2  
APPLICATION NO. : 11/204419  
DATED : July 24, 2007  
INVENTOR(S) : Barrie Arnold Loberg Page 1 of 1

It is certified that error appears in the above-identified patent and that said Letters Patent is hereby corrected as shown below:

Column 2
Line 45, change "tends" to --tend--

Column 4
Line 26, after "one or more acts", insert --acts of (and steps for)--

Column 14
Line 7, before "three-dimensional", change "an" to --a--
Line 54, change "farther" to --further--

Column 16
Line 55, before "three-dimensional", change "an" to --a--

Signed and Sealed this

Twentieth Day of May, 2008

JON W. DUDAS
*Director of the United States Patent and Trademark Office*